(12) United States Patent  (10) Patent No.: US 9,267,633 B2
Vogus  (45) Date of Patent: Feb. 23, 2016

(54) HOSE LOCK WITH LIVING HINGE, HOME APPLIANCE INCLUDING HOSE LOCK WITH LIVING HINGE AND METHOD OF ASSEMBLING HOME APPLIANCE INCLUDING HOSE LOCK WITH LIVING HINGE

(71) Applicant: BSH Home Appliances Corporation, Irvine, CA (US)

(72) Inventor: Jeff Vogus, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 438 days.

(21) Appl. No.: 13/794,862

(22) Filed: Mar. 12, 2013

(65) Prior Publication Data

US 2014/0265769 A1    Sep. 18, 2014

(51) Int. Cl.
  *E03C 1/06* (2006.01)
  *F16L 55/00* (2006.01)
  *F16L 3/10* (2006.01)
  *A47L 15/42* (2006.01)
  *D06F 39/08* (2006.01)
  *D06F 39/12* (2006.01)

(52) U.S. Cl.
  CPC ............ *F16L 55/00* (2013.01); *A47L 15/4223* (2013.01); *F16L 3/1075* (2013.01); *D06F 39/083* (2013.01); *D06F 39/12* (2013.01); *Y10T 29/49826* (2015.01)

(58) Field of Classification Search
  CPC ................................... F16L 55/00; E03C 1/06
  See application file for complete search history.

(56) References Cited

U.S. PATENT DOCUMENTS

| 4,386,752 | A | 6/1983 | Pavlak et al. |
| 4,564,163 | A | 1/1986 | Barnett |
| 4,669,688 | A | 6/1987 | Itoh et al. |
| 4,775,121 | A | 10/1988 | Carty |
| 4,881,705 | A | 11/1989 | Kraus |
| 5,613,655 | A | 3/1997 | Marion |
| 5,669,590 | A * | 9/1997 | Przewodek .................. 248/68.1 |
| 5,820,048 | A | 10/1998 | Shereyk et al. |
| 6,206,331 | B1 | 3/2001 | Keith et al. |
| 6,311,935 | B1 | 11/2001 | Mullen, Jr. |
| 7,071,418 | B2 | 7/2006 | Brockman et al. |
| 7,387,282 | B2 | 6/2008 | Kovac |
| 7,404,548 | B2 | 7/2008 | Kwilosz |
| 2011/0012485 | A1 * | 1/2011 | Busing et al. ................. 312/228 |

* cited by examiner

*Primary Examiner* — Jason Ko
(74) *Attorney, Agent, or Firm* — James E. Howard; Andre Pallapies

(57) ABSTRACT

A home appliance, such as a dishwasher, and a method of assembling a home appliance includes a basin with an integrally formed hose lock. The hose lock includes a slot component and a tab connected to the slot component by way of a living hinge. When the living hinge is bent, a slot in the slot component is closed-off by the tab to secure a hose in the slot component.

26 Claims, 9 Drawing Sheets

HOSE LOCK WITH LIVING HINGE, HOME APPLIANCE INCLUDING HOSE LOCK WITH LIVING HINGE AND METHOD OF ASSEMBLING HOME APPLIANCE INCLUDING HOSE LOCK WITH LIVING HINGE

FIELD OF THE TECHNOLOGY

The present technology relates to a connection in a home appliance such as a dishwasher. More particularly, the present technology relates to an enhancement to a hose lock that makes locking a hose easier.

BACKGROUND

In the modern kitchen, one common appliance is the dishwasher, or in more specific terms, the automatic dishwasher. Most automatic dishwashers share certain basic components. There is a compartment in which the dishes or crockery are placed and enclosed for treatment or washing. Commonly, there is at least one rack to hold the items to be cleaned. A hinged door or sliding drawer is commonly used to enclose the compartment and its contents. There are commonly a number of nozzles for spraying water to facilitate the cleaning within the compartment and a basin that collects water sprayed from the nozzles. A drain is incorporated into the basin and the drain is connected to a hose to allow water to be removed from the dishwasher. Lastly, there is a dispenser for detergent to release detergent into the compartment during the treatment process and the detergent dispenser will have a cover to hold the detergent therein. Of course, it is to be understood that these components are common and basic, and that individual appliances will differ in the make-up of their components.

When the dishwasher is being installed or assembled, the hose must be connected to the basin, and the hose is preferably held in place to ensure a preferred orientation of the hose. Often, the hose is fastened in place by a number of additional, separate components.

A need has developed to address one or more shortcomings of the prior art.

SUMMARY

The Applicant discovered that conventional, separate hose locks are prone to being lost and incur unnecessary expense. At least partially due to their separate nature, conventional hose locks increase cost and difficulty of use. One aspect of the present technology is to provide a hose lock that overcomes one or more of the shortcomings of the prior art.

Another aspect of the present technology is directed to a home appliance (dishwasher, oven, washer, dryer or refrigerator, etc.) comprising a container for liquid, a fluid connection associated with the container and adapted to connect to a hose, and a hose lock integrally formed (or formed in once piece) with the container, and the hose lock being adapted to secure the hose to the container separately from the fluid connection, e.g., via a securing mechanism, e.g., a hinge, a living hinge, a slider, a pivotable member, etc.

In examples, (a) the home appliance is a dishwasher, (b) the container is a dishwasher basin and the fluid connection drains the basin, (c) the hose lock comprises a slot component with a slot and a tab that secures the hose in the slot, (d) the living hinge connects the tab to the slot component, (e) the slot component, the tab and the living hinge are all formed together as a substantially planar component prior to an initial deformation of the living hinge, (f) the substantially planar component includes a thickness and the living hinge forms a bend that is substantially perpendicular to the thickness, (g) the living hinge is bendable such that the tab and the slot component come close to or in contact with one another to substantially double a thickness of the substantially planar component when the tab is in a closed condition, (h) a latch component is disposed on the tab and an opening is disposed on the slot component, and the latch component and the opening form a snap fit, (i) the latch component extends substantially perpendicular from the tab (j) a midpoint of the opening and a midpoint of the latch are substantially equidistant from, but on opposite sides of, the living hinge, (k) a second substantially planar component is integrally formed with and substantially perpendicular to the substantially planar component, (l) both the substantially planar component and the second substantially planar component extend from the container, (m) the slot comprises a detent sized to secure the hose prior to closing the hose lock, and/or (n) the detent is adapted to engage a corrugation in the hose.

Another aspect of the present technology is directed to a method of assembling a home appliance. The method comprises forming a container for liquid, the container comprising a hose lock, attaching a hose to the container to form a fluid connection between the hose and the container, disposing the hose within the hose lock; and locking the hose lock (by bending the hose lock at a living hinge, or otherwise bending, flexing, pivoting, sliding or snapping a component into place) to secure the hose to the container separately from the fluid connection.

In examples, (a) the home appliance is a dishwasher, (b) the container is a dishwasher basin and the hose drains the basin, (c) a slot, a tab and the living hinge are formed in a substantially planar component, the substantially planar component forming the hose lock prior to bending, (d) the living hinge is bent along a pivot that is substantially perpendicular to a thickness of the planar component, (e) the hose lock is bent at the living hinge to bring the tab and a peripheral portion of the slot close to or in contact with one another to form a resultant structure with a thickness that is substantially double a thickness of the substantially planar component, (f) a latch component of the tab is inserted into an opening in the peripheral portion to form a snap fit and secure the tab in a closed position, (g) a second substantially planar component that is integrally formed with and substantially perpendicular to the substantially planar component, (h) the substantially planar component and the second substantially planar component are formed to extend from the container, and/or (i) the slot is formed with an integral detent and the detent is sized to secure the hose prior to bending the hose lock at the living hinge.

Another aspect of the present technology is directed to a hose lock. The hose lock comprises a slot component with a slot adapted to receive a hose, a tab component, a living hinge that connects the slot component to the tab component. The slot component, the tab component and the living hinge are formed as one substantially planar component prior to an initial deformation of the living hinge, and the living hinge is adapted to form a bend that is substantially perpendicular to a thickness of the substantially planar component.

In examples, (a) the living hinge is bendable such that the tab and the slot component come close to or in contact with one another to substantially double the thickness of the substantially planar component when the tab is in a closed condition, (b) a latch component is disposed on the tab component and an opening on the slot component, wherein the latch component and the opening form a snap fit, (c) a midpoint of the opening and a midpoint of the latch are substantially equidistant from, but on opposite sides of, the living hinge, and/or (d) the slot comprises a detent adapted to secure the hose prior to closing the hose lock.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of the present technology. In such drawings.

DETAILED DESCRIPTION

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
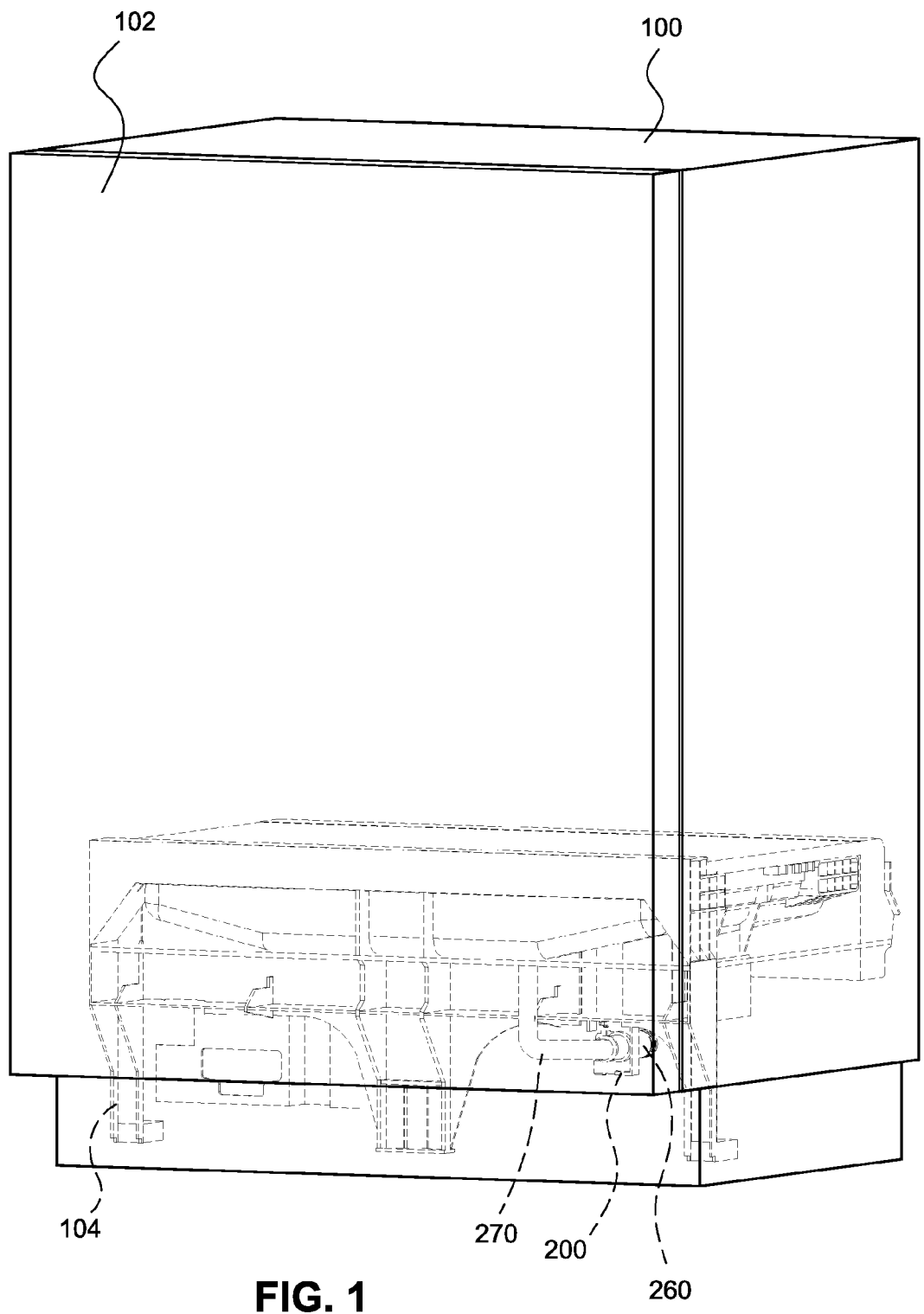
FIG. 1 is a home appliance including a hose lock, according to an example of the present technology.

FIG. 1 shows a perspective view of a domestic appliance depicted as a dishwasher 100. The dishwasher 100 includes a door 102 through which dishes can be loaded. Internal to the dishwasher 100, shown in dashed lines is a base 104. The base includes a hose lock 200 securing a hose 260.

Figure 2A:
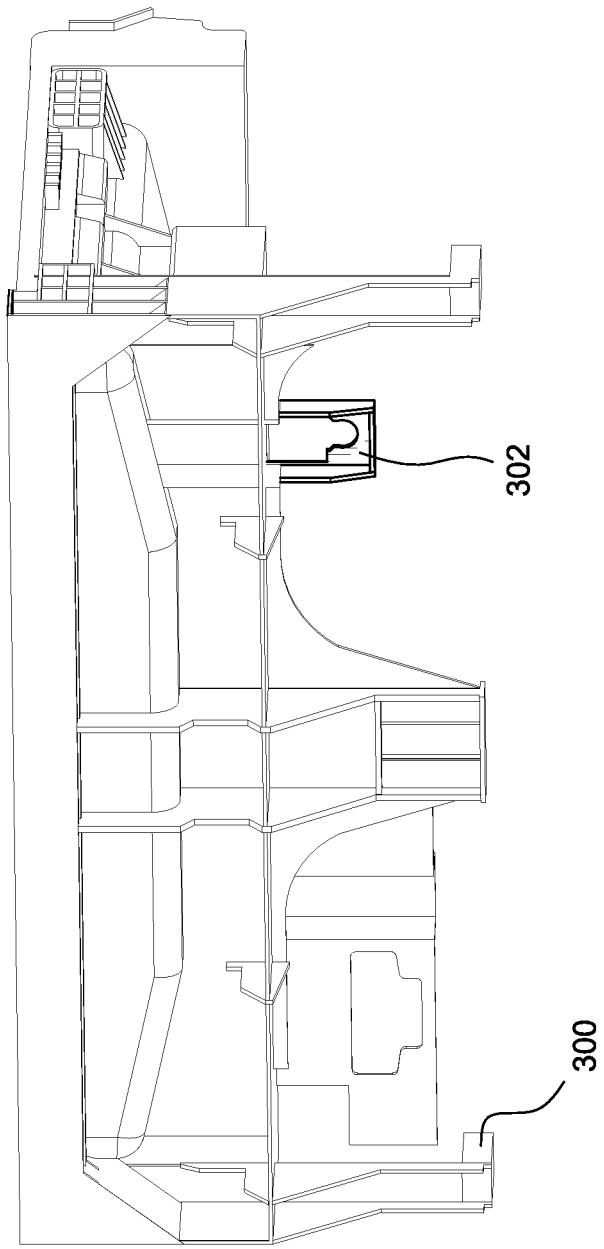
FIGS. 2A and 2B are a base of a dishwasher, according to the related art.
Figure 2B:
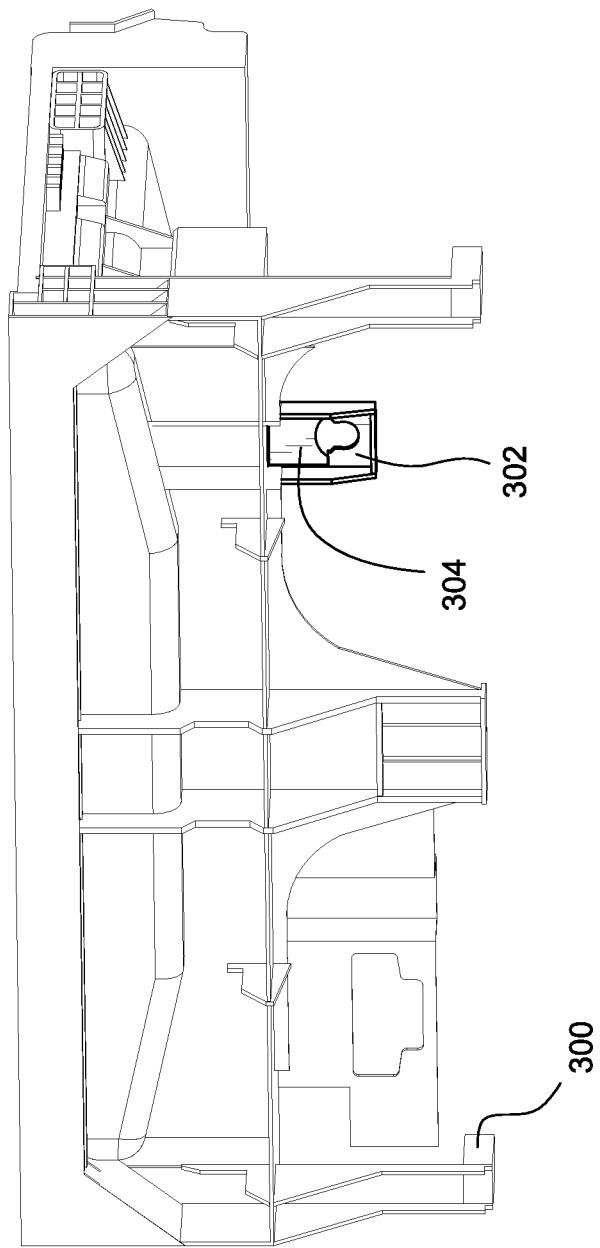

FIG. 2A shows a base 300 in accordance with the related art. The base 300 includes a horseshoe member 302. The horseshoe member 302 is adapted to retain a hose when a retainer 304 (as shown in FIG. 2B) is mated with the horseshoe member 302. The retainer 304 is not affixed to the horseshoe member 302 prior to a hose being inserted in the horseshoe member 302.

Figure 3:
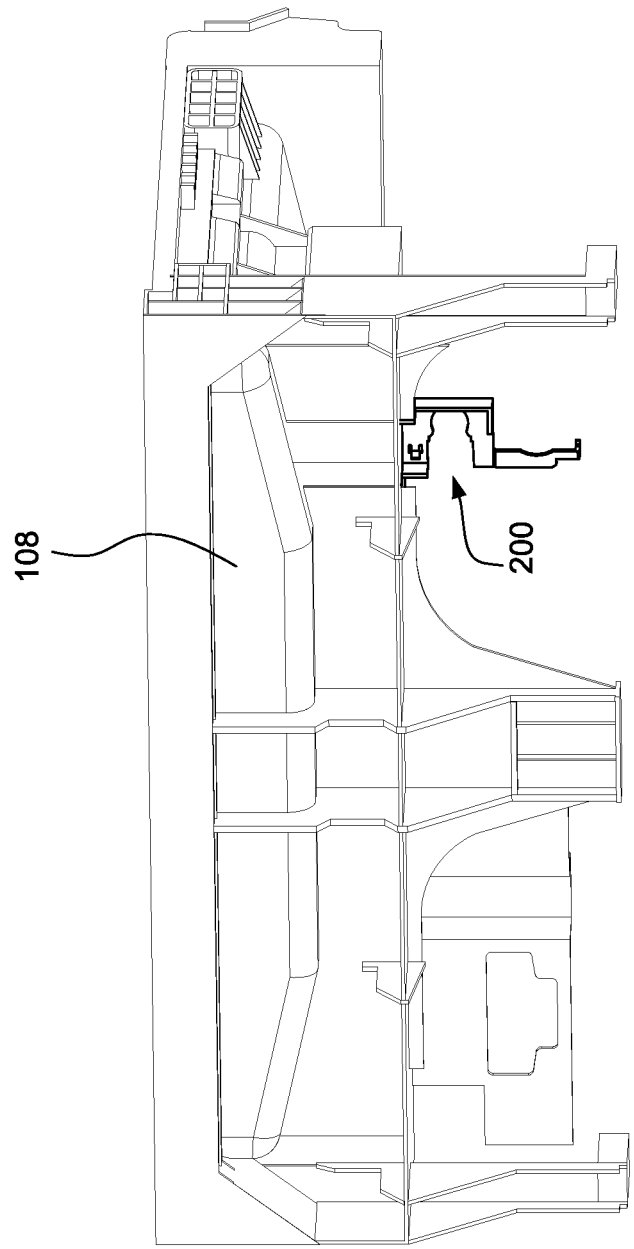
FIG. 3 is a base of a dishwasher including a hose lock, according to an example of the present technology.

FIG. 3 is a detailed perspective view of the base 104 of FIG. 1, which includes the hose lock 200, shown in an open condition, and the basin 108. In an example, the hose lock 200 and the basin 108 are integrally formed components of, or formed as one piece with, the base 104. That is, the basin 108 and hose lock 200 may be formed as one, unitary piece. Such a unitary piece could be formed, for example, by molding plastic.

The basin 108 forms a container for water that is a lower part of an interior chamber of the dishwasher 100. The details of the interior chamber, including the interior of the basin, are omitted because they are not necessary for an understanding of the present technology.

Figure 4:
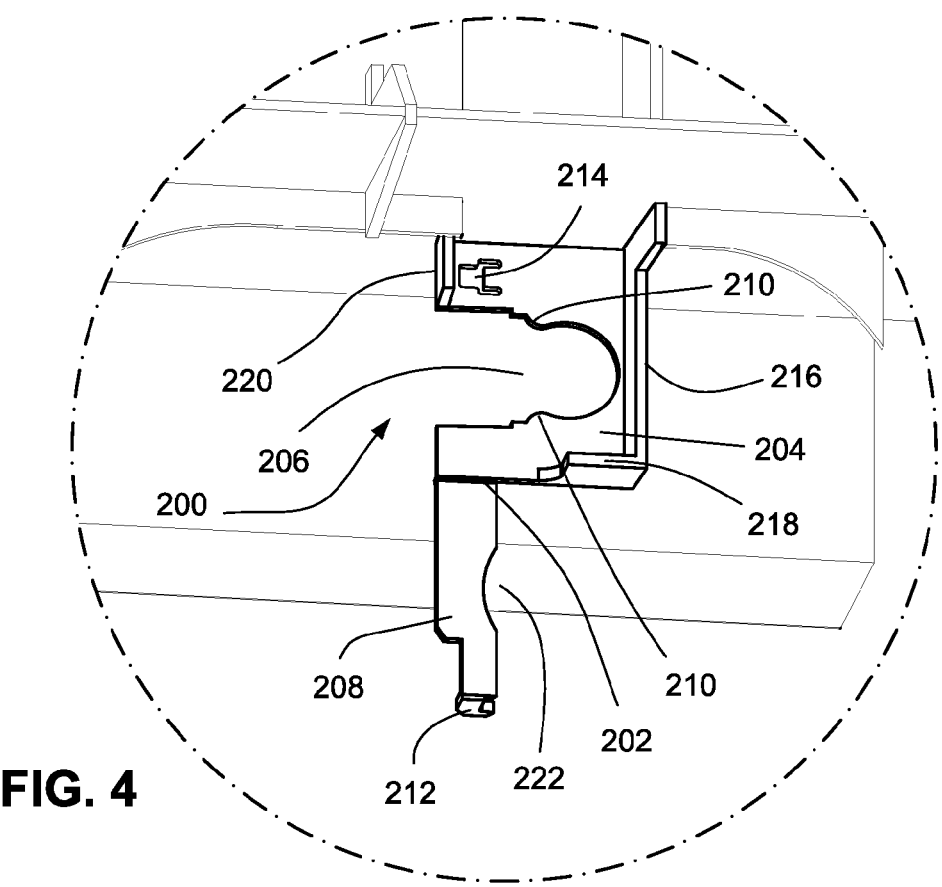
FIG. 4 is a perspective view of a hose lock, according to an example of the present technology.
Figure 5:
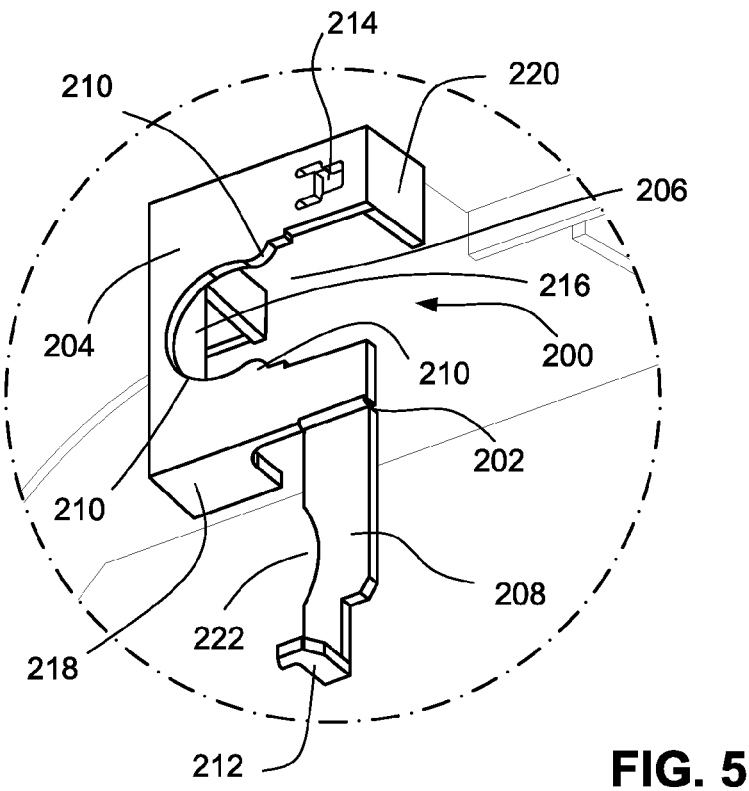
FIG. 5 is a perspective view of a hose lock, according to an example of the present technology.

FIGS. 4 and 5 show detailed views of the hose lock 200 from opposite sides. The hose lock 200 includes a securing mechanism, e.g., a living hinge 202. One example of a living hinge is a thin, flexible hinge made from the same material as two rigid pieces that the living hinge connects. Here, the living hinge 202 connects a slot component 204 to a tab 208. Alternatively, a separate member, but attached to hose lock before installation (e.g., at factory) may be provided. The slot component 204 includes a slot 206 that is illustrated with an open side and a substantially U-shape. Other shapes may be used as well. The slot 206 includes a semi-circular portion that is adapted to receive a hose (discussed below). Also, although the hose lock 200 is illustrated as including a living hinge, any other suitable connection may be employed. Examples of other suitable connections include a traditional hinge, a pivot, a sliding connection, and a flexing connection.

An advantage of the slot 206 as illustrated is that the hose 260 may be inserted into the slot 206 after both ends of the hose 260 are attached to fluid connections or similarly restrained on both ends. Thus, if more convenient for a user, the hose 260 can be fluidly connected on both ends prior to being fasted by the hose lock 200.

The slot 206 also includes a detent shown in the form of two lobes 210 that together form an opening in the slot that is slightly narrower than a diameter of the semi-circular portion. As would be understood by one of ordinary skill, the detent shown is but one example of a detent, which can be any device for positioning and holding one mechanical part in relation to another in a manner such that the device can be released by force applied to one of the mechanical parts. When the hose 260 is inserted into the detent, the hose may deflect, a portion of the slot 206 may deflect, or a combination thereof.

The slot component 204, the tab 208 and the living hinge 202 are shown as a substantially planar component. In an example, the substantially planar component at least supports, or is attached to, a latch 212 and members 216, 218, and 220. FIGS. 4 and 5 depict the living hinge prior to an initial deformation. As can be seen in FIGS. 4 and 5, the tab 208 includes a cutout 222 in the form of an arc-shaped cutout. Such a cutout 222 can provide a more secure fit for a retained hose, or such a cutout 222 can be omitted. The cutout 222 may match a shape of the hose 260.

In an example, a latch 212 is shown attached to and extended from the tab 208 at a substantially right angle from a surface of the tab 208. An opening 214 is shown in the slot component 204. The latch 212 and opening 214 may have their positions reversed such that the latch 212 is located on the slot component 204 and the opening 212 is located on the tab 208. As illustrated, the opening 214 extends through all of the thickness of the slot component 204 and is adapted to receive the latch 212. This is beneficial in that it allows for ease of manufacture, and allows for confirmation that the latch 212 is fully engaged with the opening 214. In an example, when the latch 212 is fully inserted into the opening 214 (see FIGS. 7 and 9-13), a snap fit may be formed to retain the latch 212 in the opening 214. In order to function most advantageously, a midpoint of the opening 214 and a midpoint of the latch 212 are substantially equidistant from, but on opposite sides of, the living hinge 202. As illustrated, the midpoints are with respect to a direction that is substantially perpendicular to a direction that the living hinge 202 bends.

The tab 208, slot component 204 and living hinge 202 may be arranged in other manners to achieve similar effect. For example, the living hinge 202 could be connected at a portion of the slot 206 (for example, near one of the lobes 210 or near the opening 214) instead of a periphery of the slot component 204 as illustrated. The living hinge could also be located along any other peripheral edge of the slot component 204.

Three members 216, 218 and 220, each substantially planar, are shown substantially perpendicular to the slot component 204. Each of the three members 216, 218 and 220 may be provided to increase stiffness of the slot component 204. Of course, such stiffening members may be added or omitted as necessary to meet the specific needs of a given lock member 200. As shown throughout the figures, the slot component 204 and three members 216, 218 and 220 are shown extending from a same portion of the base 104, but may also extend from the basin 108 or any other surface (which may be integral with the base 104 and/or basin 108). By extending from the same surface, rigidity of the hose lock 200 may be improved.

Figure 6:
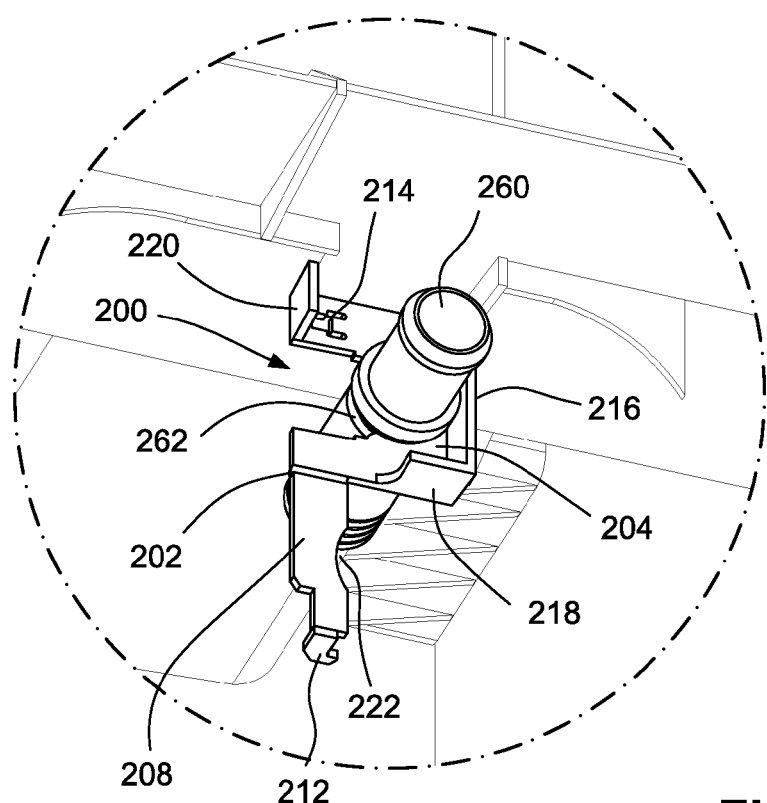
FIG. 6 is a perspective view of a hose lock and hose, according to an example of the present technology.
Figure 7:
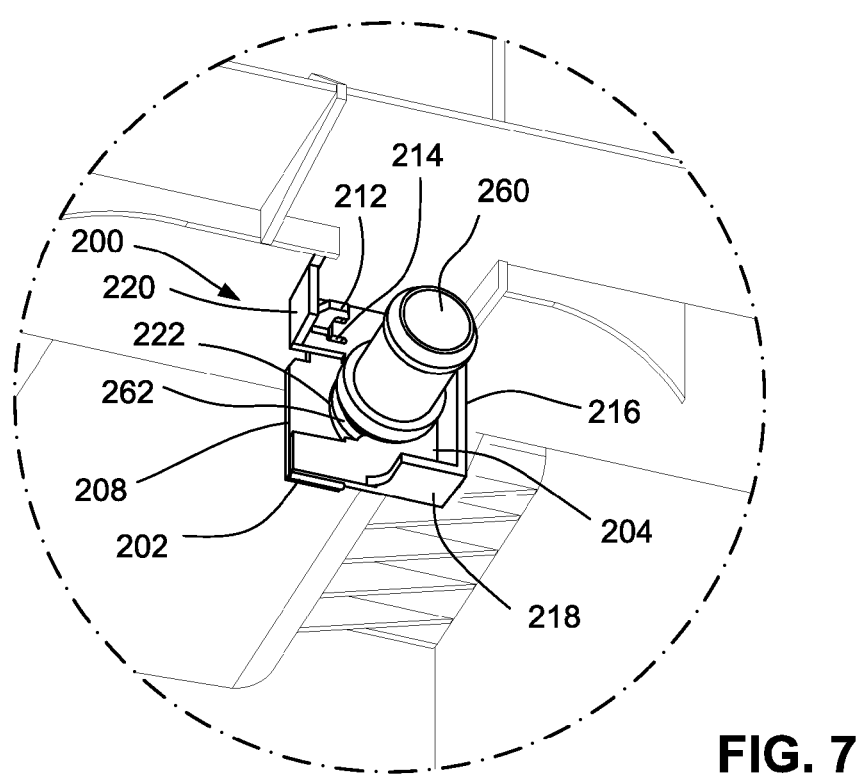
FIG. 7 is a perspective view of a hose lock and hose, according to an example of the present technology.

FIGS. 6 and 7 each show a section of hose 260 disposed within the slot 206. The hose 260 may include a groove 262 or similar structure that aids in securing the hose. For example, the hose 260 may include a single groove 262 as depicted or may be a corrugated hose with multiple grooves or a spiral groove. In an example, the groove 262 is sized such that a thickness of the slot component 204 is less than a width of the groove 262 so that a portion of the slot component 204 readily fits within the groove, although tighter fits, such as a press fit or other interference fit are also contemplated.

FIG. 7 depicts the hose lock 200 in a closed condition. In the closed condition, the living hinge 202 is bent such that the latch 212 is fully inserted in the opening 214. In such a closed condition, the living hinge 202 forms a bend that is substantially perpendicular to a thickness of the slot component 204 and a thickness of the tab 208. The resultant structure has a thickness that is substantially twice that prior to the living hinge being bent. The bend shown in FIG. 7 (and other figures) is an ideal bend where a surface of the tab 208 is fully in contact with a surface of the slot component 204. Of course, a bend that is not ideal, one where there is some residual angle between the tab 208 and the slot component 204 when the latch 212 is inserted into the opening 214 is also contemplated.

Figure 8:
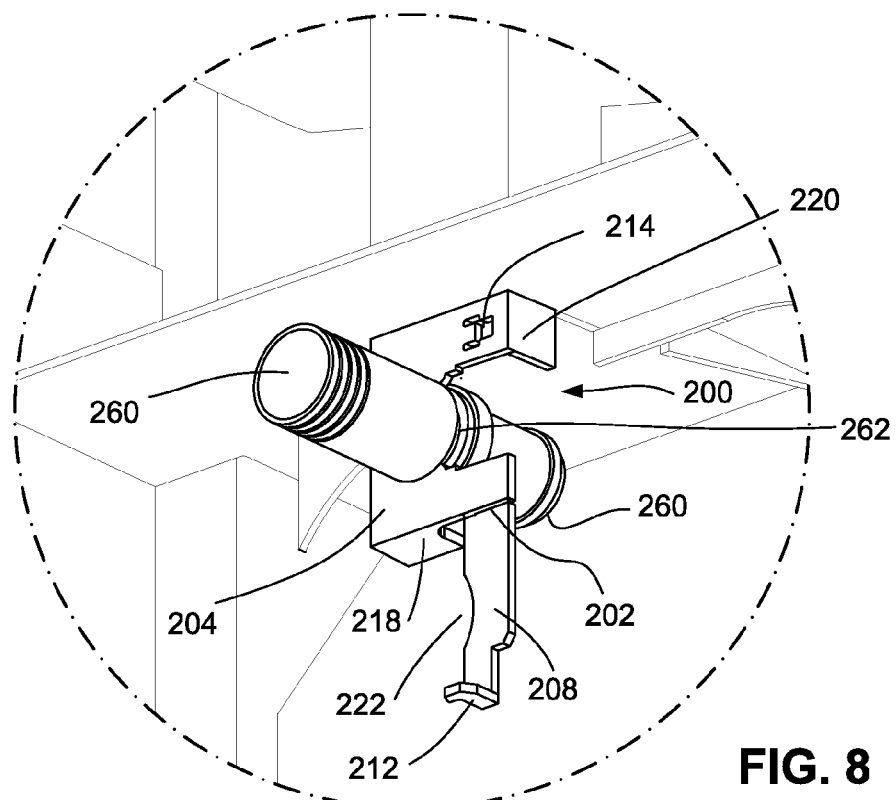
FIG. 8 is a perspective view of a hose lock and hose, according to an example of the present technology.
Figure 9:
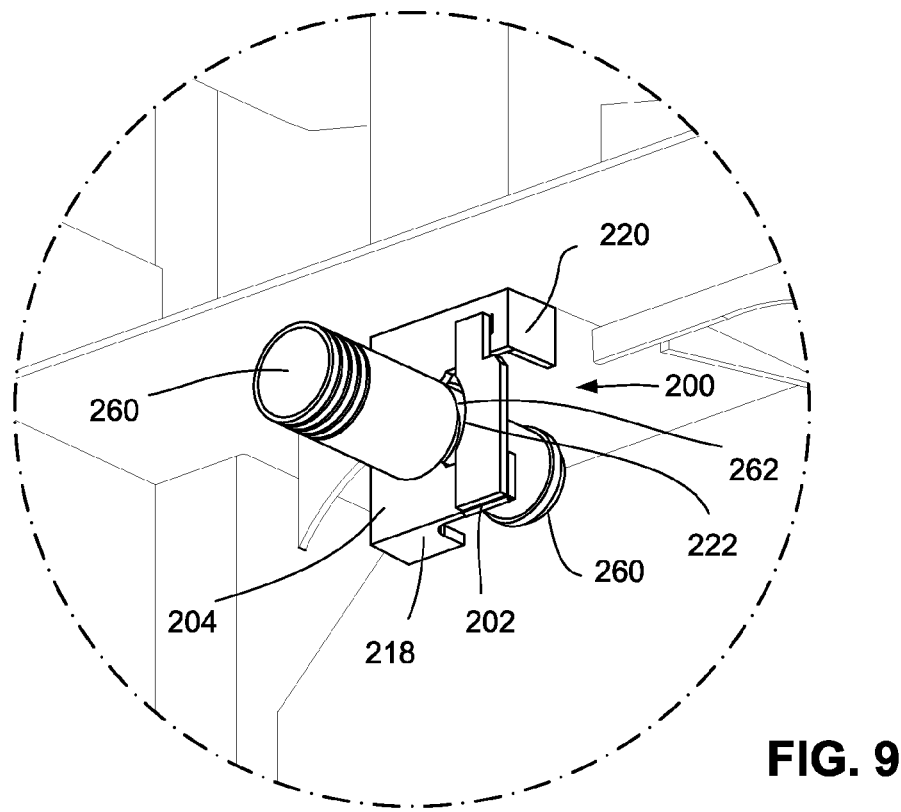
FIG. 9 is a perspective view of a hose lock and hose, according to an example of the present technology.
Figure 10:
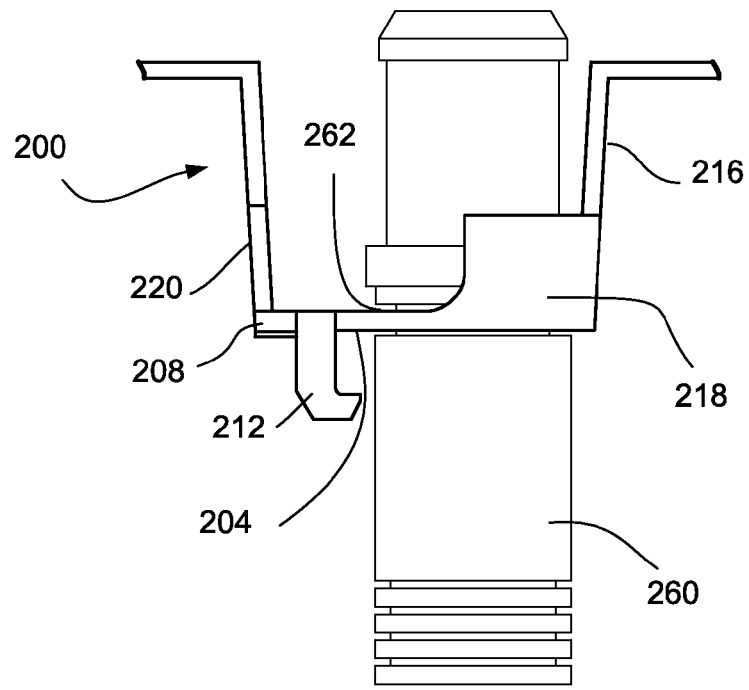
FIG. 10 is a perspective view of a hose lock and hose, according to an example of the present technology.
Figure 11:
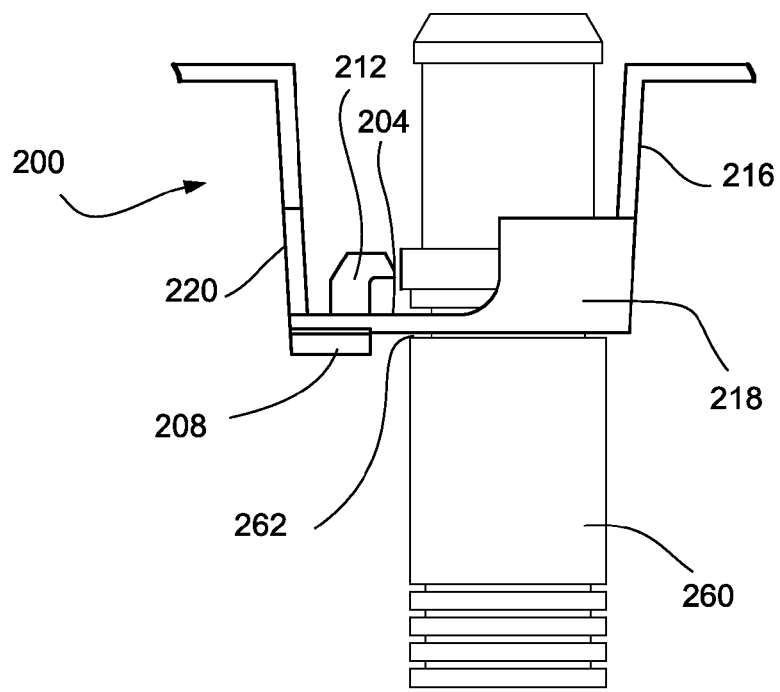
FIG. 11 is a perspective view of a hose lock and hose, according to an example of the present technology.
Figure 12:
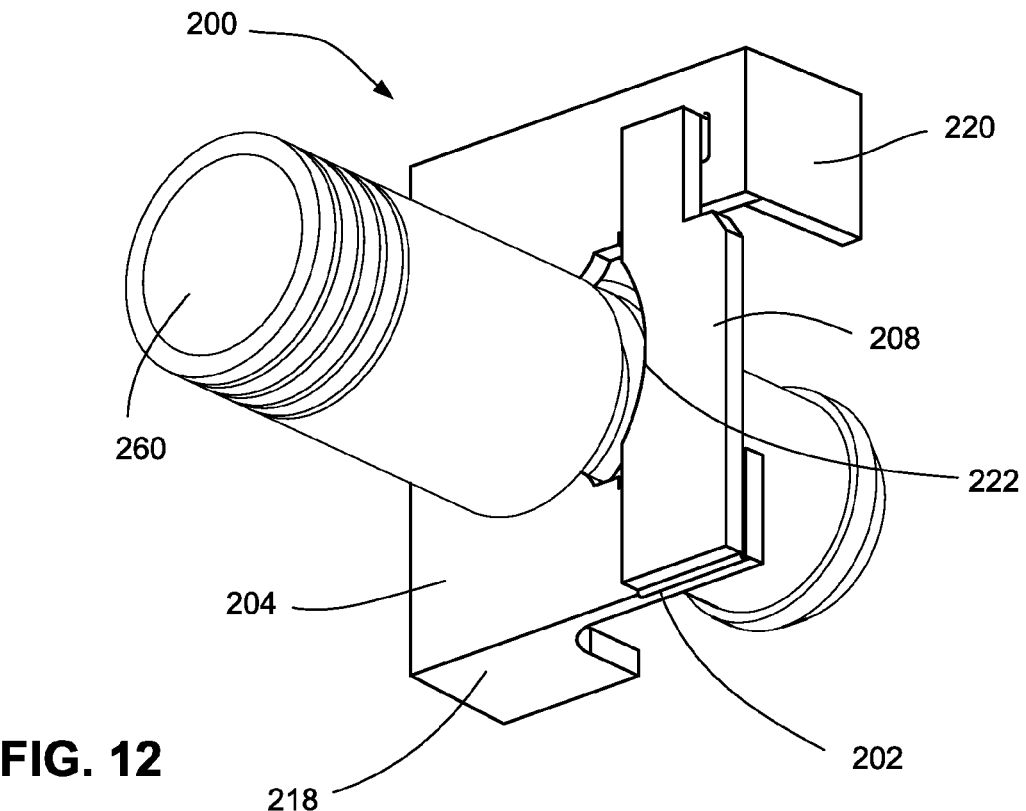
FIG. 12 is a perspective view of a hose lock and hose, according to an example of the present technology.
Figure 13:
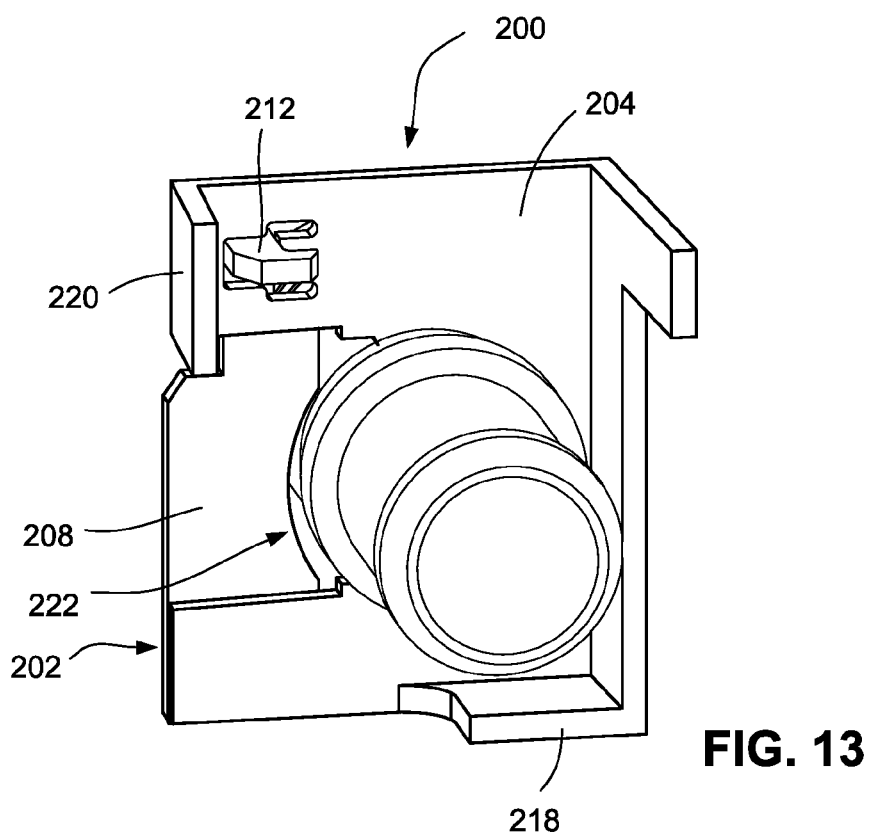
FIG. 13 is a perspective view of a hose lock and hose, according to an example of the present technology.

FIGS. 8 and 9 are similar to FIGS. 6 and 7 but from a different (substantially opposite) viewpoint.

FIGS. 10-13 are similar to FIGS. 6-9 except that the hose lock 200 is shown separate from the base 104 and basin 108. Such a hose lock 200 could be attached to any suitable device where it is desirable to lock a hose 260, or any similar structure, in place.

FIGS. 4-6 provide exemplary illustrations for a method of assembly according to the present technology. A hose 260 is attached to the basin 108 to provide a fluid connection 270 (see FIG. 1, not show in other figures for clarity in those figures) between the basin 108 and the hose 260. Any suitable type or location of fluid connection may be used. The hose 260 is also placed within the slot 206 of the slot component 204 and secured by a detent. After the hose 260 is inserted in the slot 206, the living hinge 202 is bent such that the tab 208 moves towards the slot component 204 such that the latch 212 is inserted into the opening 214. When the latch 212 is fully inserted into the opening 214, a snap fit is formed between the latch 212 and the opening 214. After the snap fit is formed, the tab 208 and the slot component 204 are close to or in contact with one another such that the resultant bent structure has a thickness that is substantially twice that of the un-bent structure. An open end of the slot 206 is thus closed by the tab 208 such that the hose 260 cannot be removed from the slot 206 through the open end of the slot without removing the tab 208.

As used herein, the term substantially is intended to encompass at least deviations from an ideal or perfectly manufactured component that are still within acceptable tolerances for use.

While the present technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the technology.

What is claimed is:

1. A home appliance comprising:
 a container for liquid;
 a fluid connection associated with the container and adapted to connect to a hose; and
 a hose lock comprising a slot component with a slot and a tab that secures the hose in the slot and a living hinge, the hose lock being integrally formed with the container, and the hose lock being adapted to secure the hose to the container separately from the fluid connection,
 wherein the slot component, the tab and the living hinge are all formed together as a substantially co-planar component prior to an initial deformation of the living hinge.

2. The home appliance according to claim 1, wherein the home appliance is a dishwasher.

3. The home appliance according to claim 2, wherein the container is a dishwasher basin and the fluid connection drains the basin.

4. The home appliance according to claim 1, wherein the living hinge connects the tab to the slot component.

5. The home appliance according to claim 1, wherein the substantially co-planar component includes a thickness and the living hinge forms a bend that is substantially perpendicular to the thickness.

6. The home appliance according to claim 1, wherein the living hinge is bendable such that the tab and the slot component come close to or in contact with one another to substantially double a thickness of the substantially co-planar component when the tab is in a closed condition.

7. The home appliance according to claim 1, further comprising a latch component disposed on the tab and an opening on the slot component, wherein the latch component and the opening form a snap fit.

8. The home appliance according to claim 7, wherein the latch component extends substantially perpendicular from the tab.

9. The home appliance according to claim 7, wherein a midpoint of the opening and a midpoint of the latch are substantially equidistant from, but on opposite sides of, the living hinge.

10. The home appliance according to claim 1, further comprising a second substantially co-planar component integrally formed with and substantially perpendicular to the substantially co-planar component.

11. The home appliance according to claim 10, wherein both the substantially co-planar component and the second substantially co-planar component extend from a surface integrally formed with the container.

12. The home appliance according to claim 1, wherein the slot comprises a detent sized to secure the hose prior to closing the hose lock.

13. The home appliance according to claim 12, wherein the detent is adapted to engage a corrugation in the hose.

14. A method of assembling a home appliance, comprising:
forming a container for liquid, the container comprising a hose lock including a substantially co-planar component with a slot, a tab and a living hinge;
attaching a hose to the container to form a fluid connection between the hose and the container;
disposing the hose within the hose lock; and
bending the substantially co-planar component at the living hinge to secure the hose to the container separately from the fluid connection.

15. The method of assembling a home appliance according to claim 14, wherein the home appliance is a dishwasher.

16. The method of assembling a home appliance according to claim 15, wherein the container is a dishwasher basin and the hose drains the basin.

17. The method of assembling a home appliance according to claim 14, wherein the living hinge bends along a pivot that is substantially perpendicular to a thickness of the co-planar component.

18. The method of assembling a home appliance according to claim 14, further comprising bending the hose lock at the living hinge to bring the tab and a peripheral portion of the slot close to or in contact with one another to form a resultant structure with a thickness that is substantially double a thickness of the substantially co-planar component.

19. The method of assembling a home appliance according to claim 18, further comprising inserting a latch component of the tab into an opening in the peripheral portion to form a snap fit and secure the tab in a closed position.

20. The method of assembling a home appliance according to claim 14, further comprising forming a second substantially co-planar component that is integrally formed with and substantially perpendicular to the substantially co-planar component.

21. The method of assembling a home appliance according to claim 20, wherein the substantially co-planar component and the second substantially co-planar component are formed to extend from the container.

22. The method of assembling a home appliance according to claim 14, wherein the slot is formed with an integral detent and the detent is sized to secure the hose prior to bending the hose lock at the living hinge.

23. A home appliance comprising:
a container for liquid;
a fluid connection associated with the container and adapted to connect to a hose; and
a hose lock integrally formed with the container, the hose lock comprising a slot component with a substantially U-shaped slot, a tab, and a living hinge that connects the tab to the slot component, wherein
the U-shaped slot, the tab and the living hinge are substantially co-planar prior to an initial deformation of the living hinge,
the hose lock is adapted to receive the hose and secure the hose to the container separately from the fluid connection after a first end of the hose is connected to the fluid connection,
the substantially U-shaped slot has an open side to laterally receive the hose, and
the tab is configured to close off the open side once the hose has been laterally inserted into the open side.

24. The home appliance according to claim 23, wherein the home appliance is a dishwasher.

25. The home appliance according to claim 24, wherein the container is a dishwasher basin and the fluid connection drains the basin.

26. The home appliance according to claim 23, wherein the hose lock is adapted to receive and secure the hose when a second end of the hose is connected to another fluid connection.

* * * * *